Nov. 9, 1965     W. E. SCHOENBORN     3,216,699
AIRFOIL MEMBER ASSEMBLY
Filed Oct. 24, 1963
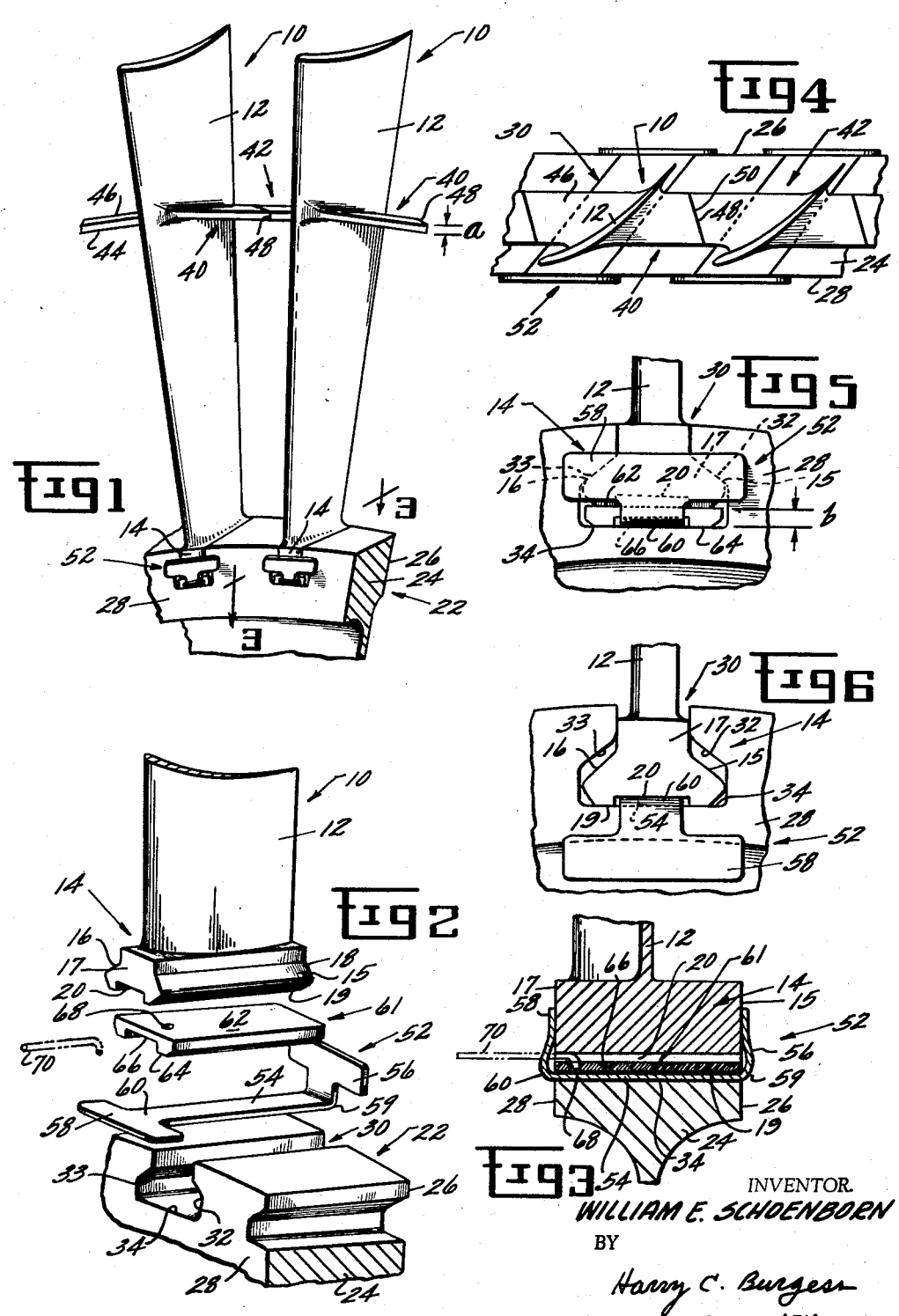
INVENTOR.
WILLIAM E. SCHOENBORN
BY
Harry C. Burgess
ATTORNEY 3,216,699
AIRFOIL MEMBER ASSEMBLY
William E. Schoenborn, Mason, Ohio, assignor to General Electric Company, a corporation of New York
Filed Oct. 24, 1963, Ser. No. 318,557
4 Claims. (Cl. 253—77)

This invention relates to an improved means for assembling turbomachinery airfoil members with associated supporting structure and, more particularly, to an improved means for assembling such members having contiguous stiffening or vibration dampening means intermediate the ends thereof in rows in grooves in blade supporting structure adapted to receive root portions of the members in a manner such as to permit an individual airfoil member to be removed or inserted, with suitable locking means, without interference with the contiguous airfoil stiffening or vibration dampening means of adjacent airfoil members of the row.

It is known that turbomachinery airfoils, for example, rotor blades and stator vanes used in steam or gas turbine components including axial-flow compressors and turbines, are subject to vibrations during operation. Frequently, with use of extremely long and thin blades or vanes the vibrations can assume such proportions that dampening or stiffening of the airfoils is required. It is also known to use means projecting laterally of the airfoil portion of the blades or vanes and located intermediate the radial ends thereof for stiffening or dampening, these tongue-like projections conventionally inferengaging like projections of adjacent airfoil members. Vibration dampening may thus be provided by frictional interengagement, as is disclosed in the patent to Mikina 2,198,784. These integrally-formed, laterally-extending airfoil portions, or partitions, may also be secured to each other at the lateral ends thereof for further stiffening of the row of blades or vanes. Thus, as shown in the patent to Conrad et al. 2,472,886, provision may be made for blades having integral projections extending from opposite sides of the air foil to be welded—or lashed—together to form a contiguous stiffening ring member to avoid vibration or stress problems over the range of the turbomachine operating speeds.

Where it is desirable, however, that individual blades or vanes of a row be capable of being removed separately, when worn or damaged, it is inadvisable to permanently secure these lateral projections one to the other in the ring or shroud. Further, it has been found to be desirable for improved vibration dampening characteristics that the abutting edges of the opposing adjacent lateral airfoil projections or partitions *not* be projected along lines parallel to the axial grooves or slots into which the blade or vane roots are inserted for support in the turbomachinery. Thus, contrary to the arrangement shown in the patent to Johansson 2,421,890, it is sometimes necessary that the joint formed by the abutting end portions of the intermediate blade partitions be projected along a line at an acute angle to the centerline of the blade retaining slots such that axially slidable removal of a single blade without interference between the lateral abutting projections of adjacent bladed members is impossible. If the airfoil members are to be separately or individually removed and assembled in the retaining groove, means must be provided for permitting such removal or insertion without interference between the contiguous interengaging blade projections or partitions of the stiffening or dampening ring.

Accordingly, the general object of the present invention is a means for assembling and dis-assembling individual turbomachinery airfoil members arranged in a row in a supporting structure and having contiguous abutting vibration reducing or stiffening means projecting laterally of the airfoils intermediate the radial lengths thereof.

A more specific object of the present invention is to provide an improved means for assembly and retention of individual shrouded blade or vane members of a row in axial grooves in a supporting member wherein the elements of the assembly are so proportioned that removal of or insertion in the grooves of individual members of the row is possible without interference with adjacent members.

Briefly stated, in accordance with one embodiment of my invention, I provide for use with turbomachinery blading arranged in rows and having laterally-extending, contiguous stiffening or vibration dampening means intermediate the ends of the blades, means for assembling individual blades in generally axial grooves in blade supporting structure in a manner such as to permit separate removal, or insertion, of a single blade, including a locking key having an intermediate portion and a pair of end tabs bent transversely thereto, the key being adapted to overlie the supporting structure so as to prevent axial movement of the blade in the groove, and a spacer member having a top portion and a bottom portion including a slot therein. The spacer is arranged to overlie the key with the intermediate portion thereof located in the spacer slot, the bottom portion of the spacer being supported on the base portion of the groove, the top portion of the spacer supporting the blade, and the key tabs bent transversely of the intermediate portion to lock the blade, as described above. The radial width (with respect to the turbomachinery axis) of the spacer member in the assembly is so proportioned as to be at least equal to the radial width of the laterally-extending contiguous blade stiffening or vibration dampening means so that removal of the spacer axially of the supporting groove will permit radial displacement of its associated blade member to allow removal thereof without interference with the blade stiffening or vibration dampening means of adjacent blades.

While the specification concludes with claims particularly pointing out and distinctly claiming the subject matter which I regard as my invention, it is believed that the invention will be better understood from the following description, taken in conjunction with the accompanying drawings in which:

FIG. 1 is a pictorial view of a pair of adjacent blades having contiguous stiffening or vibration dampening means and arranged in a row assembled in supporting structure, in the example, a rotor wheel disk, a segment of which is shown;

FIG. 2 is an exploded, partial view of the assembly of FIG. 1 illustrating the separate components of the invention;

FIG. 3 is a partial cross-sectional view along lines 3—3 of FIG. 1;

FIG. 4 is a plan view in a radially inward direction of part of an assembled blade row;

FIG. 5 is a partial segment view looking axially of the illustrated turbomachinery component and illustrating the the invention in an assembled form; and FIG. 6 is a view showing a partial assemblement of the elements of FIG. 5.

It will be understood that while an axial-flow turbomachine compressor is depicted for illustrative purposes, the invention could equally be utilized in other turbomachinery components wherever it is desirable to stiffen or prevent vibration in rows of airfoil members by means of contiguous frictionally engaged lateral projections while at the same time permitting removal of individual blade or vane members which would otherwise be prevented by interference of the adjacent blade stiffening or vibration dampening means.

Indicated generally at 10 in the drawings is a pair of identical rotor blades each having a radially extending airfoil portion 12 and a root portion 14. As best seen in FIG. 2, the blade root or base portion includes pairs of oppositely directed, longitudinally extending faces 15 and 16, end faces 17 and 18 and a bottom portion 19. In the bottom portion is a slot 20 extending longitudinally of the blade root. In the disclosed embodiment, the blade supporting structure comprises a rotor wheel disk, indicated generally at 22, having an enlarged rim portion 24 and a pair of oppositely-directed (axially of the rotor) faces 26 and 28. Extending through the rim portion in a generally axial direction relative to the rotor are individual blade receiving grooves, indicated at 30. These grooves comprise pairs of longitudinally extending angled side walls 32 and 33 and a wider base or bottom wall 34. As will be obvious from the drawings, the general overall shape of the disk or wheel grooves generally corresponds to the shape of the blade roots with a clearance to be described. Thus, longitudinal faces 15 and 16 of the blade roots are shaped to abut and be retained against the action of centrifugal force by the angled walls 32 and 33, respectively, of the rotor wheel grooves 30.

As stated previously, it is sometimes desirable, particularly with use of relatively long turbomachinery blading, to provide means for dampening vibrations through friction between members. The dampening or stiffening means may be integral with the blades, such as projections laterally of the blade airfoils, and be located intermediate the radially spaced airfoil ends. The blade lashings or partitions, as they are sometimes called, may take the form of the contiguous, interengaging tongue-like elements, indicated generally at 40 and 42 in the drawings. Each of these partition elements include a bottom wall or surface 44, a top surface 46, and an end or lateral portion or wall 48. As shown, therefore, the partitions are generally flat, laterally extending members which when in interengagement with adjacent members form what may be termed a blade dampening ring or shroud. During rotor operation the action of the motive fluid against the airfoils will cause the blades 10 to "untwist." This causes the abutting lateral wall portions 48 of partition 40, 42 to rub; hence, dampening occurs by frictional vibration dampening. As seen in the plan view of FIG. 4, the ring or shroud is formed of the contiguous abutting partitions 40 and 42. It will be noted that the line of abutment, indicated generally at 50, of adjacent partitions is angled or slanted with respect to the rotor grooves. This improves frictional dampening by causing increased rubbing during "untwisting" motion of the blades about their longitudinal axis during rotor operation. Note also from FIGS. 1 and 4 that the plane of the abutting edges 48 of the adjacent partitions 40–42 is in a generally radial direction with respect to the rotor, i.e., it is not slanted, so that there is no overlap beween the adjacent lateral blade partitions. Also the plan view illustrates that the blade base grooves 30 in the rotor disk extend between the opposed faces 26–28 of the disk in a generally axial direction, but at a slight angle to the axis of the turbomachine depicted herein. Thus, it will be apparent that movement axially—longitudinally—of the grooves will not permit the bladed members to be removed individually because of interference between the adjacent laterally-extending partitions 40–42 of each blade of the row.

Means for locking the individual blades in the grooves to prevent axial separation from the disk will now be described. A plurality of key members, one of which is indicated generally at 52 in FIG. 2, are provided which comprise an intermediate or flat portion 54 bounded at either end by locking tab portions 56 and 58. The locking tab portions are of increased width relative to the flat intermediate portion 54 and are adapted to be bent up at 59 and 60 for overlying the axial faces 26 and 28, respectively, of the rotor wheel, as best shown in FIGS. 3 and 5. An improved method for locking blades in grooves against axial separation by use of keys or tabs is described in the patent to Carli et al. 3,045,329, of common assignment.

A significant feature of my invention for permitting individual removal of the airfoil members 10 will now be described. As indicated in FIGS. 2 and 3, there is provided a series of spacer elements, one of which is indicated generally at 61. Each spacer element comprises a top portion or surface 62 and a bottom surface 64 having a longitudinally (axially) extending channel 66 cut therein. As seen in FIGS. 5 and 6, when assembled, the flat intermediate portion 54 of the key member 52 is adapted to fit into the channel 66 of the spacer. With reference also to FIG. 1, it will be noted that while dimension "a" is the radial thickness of the contiguous ring or shroud comprised of the individual laterally extending partitions 40 and 42 in interengagement, dimension "b" in FIG. 5 is the radial width or thickness of the spacer element 61. Dimensions "a" and "b" are, in actuality, approximately equal for the purpose now to be described.

In assembling a row of airfoil members in an axial flow compressor or turbine rotor wherein the members have the vibration dampening or blade stiffening means described hereinabove, the steps of assembly may proceed as follows. First, as depicted in FIG. 2, the key members 52 are inserted in the rotor wheel grooves 30 in a manner such that the flat intermediate portion 54 of each key member overlies the bottom wall 34 of the grooves. The locking tabs 56 and 58 are either unbent or one tab (e.g., tab 56 in FIG. 2) is pre-bent at 59, as shown in the drawing. While the tab 56 is shown bent upwardly, at this point, it could equally well be bent downwardly as is tab 58 in FIG. 6. In any event, with the individual locking key members 52 inserted in the wheel grooves, the individual blade members 10 are next slid in the groove 30 with the bottom portion or surface 19 of the blade roots resting on the base or bottom 34 of the grooves. As shown in FIG. 6, the blade root slot 20 is placed in registry with the flat intermediate portion 54 of the key member 52. The blade is inserted all the way axially in the groove so that the end face 18 of the blade root abuts the bent up tab 56, or is flush to axial face 26 of the rotor. The clearance provided between the faces 15 and 16 of the blade root and the side walls 32 and 33 of the groove 30 and the configuration insures that the contiguous partitions 40–42 of adjacent blades do not interfere with the blade down, i.e., radially inward, in the groove. With the blade thus inserted in the rotor groove, it is raised, i.e., moved radially outward to its fullest extent, wherein the longitudinal faces 15 and 16 of the blade abut the oppositely directed side walls 32 and 33 of groove 30. At this point, the spacer elements 61 are inserted in the individual grooves 30 with the bottom surface 64 of each spacer element riding on the bottom wall 34 of the groove and the flat intermediate portion 54 of each key now residing in the channel 66 of the spacer. Since dimension "b" is equal to dimension "a" the laterally extending dampening or stiffening partition means 40 and 42 of the blades now form the contiguous ring or shroud. Finally, to retain both blades and spacers 61 in the generally axially extending rotor grooves 30, the other locking tab portions 58 are bent up at 60 to overlie in close engagement the face 28 of the rotor wheel, as is more fully described in the referenced Carli et al. patent of common assignment.

To remove an individual blade, the above described retention and assembly method is reversed. Thus, individual blades can then be removed by re-bending a tab (e.g., tab 58) to the position shown in FIG. 2 or FIG. 6, which will expose the spacer element 61 for axial disengagement of the groove 30. To facilitate this disengagement, means may be provided, such as a hole 68 through the spacer and a tool 70 adapted to hook into the hole for easy removal of the spacer. Once a spacer has been removed, as in FIG. 6 the individual blade will drop down in the groove 30, with the slot 20 in the bottom portion 19 straddling the flat intermediate portion 54 of the key member. Since dimension "b" is equal to (or very slightly greater than) dimension "a," the individual blade may be worked free of the groove without interference between the dampening or stiffening partitions 40 and 42 integral with the adjacent blade airfoil portions. Thus, instead of requiring, as would be the case with conventional lashed or dampened blades, that the entire blade row be moved axially until at least 80–90% disengaged from the wheel, the invention provides a simple, quick, and novel arrangement for single dampened blade removal and re-assembly without disturbance of the remainder of the blades in the row or stage of the turbomachine component.

It will be understood that the configuration and shape of the grooves, blade roots, spacer and key members are illustrative means only for describing my improved individual blade assembly arrangement. Thus, the invention is not limited to turbomachine rotor blades but may be utilized in any general application having separate tongue-and-groove-like members wherein interference surfaces present direct axial-longitudinal-removal of an individual tongue member from a grooved member without interference with other adjacent members.

While I have shown and described a particular embodiment of my invention, it will be obvious to those skilled in the art that various changes and modifications may be made without departing from the invention in its broader aspects. I therefore intend in the appended claims to cover all such changes and modifications as fall within the true spirit and scope of the invention.

What I claim and desire to secure by Letters Patent of the United States is:

1. In an axial-flow turbomachine:
   supporting structure including a plurality of generally axial grooves having angled walls and wider at the base and arranged in rows;
   a plurality of blade members having root and airfoil portions, said root portions being received in said grooves and shaped to abut said angled walls for retention in said grooves, there being clearance between said root portions and grooves to allow radial movement therein;
   blade member stiffening means projecting laterally from opposite surfaces of said airfoil portions, with opposing stiffening means contiguously forming a shroud ring along lines of abutment directed at an angle to the axis of the grooves;
   a spacer element received in each groove, said spacer element having an upper surface and a lower surface and being located intermediate the bottom wall of said groove and the bottom portion of said blade member root portion, said blade member root portion being supported on said upper surface, said lower surface having a longitudinal channel therein;
   locking means for retention of said spacer elements and said blade members in said grooves, said locking means comprising a key member having a pair of spaced tab end portions joined by a flat intermediate portion, said intermediate portion being received in said channel and said tab end portions being bent transversely thereof to closely overlie said supporting structure adjacent said grooves when in an assembled relationship therewith,
   wherein the radial extent of said spacer member is at least equal to the radial extent of said shroud ring, with respect to said turbomachine axis, in order that any one of said blade members may be moved radially and removed from or inserted into its associated groove individually and without interference from adjacent blade member stiffening means, in the absence of its associated spacer and key members.

2. In an axial-flow turbomachine:
   supporting structure including a plurality of generally axial grooves having angled walls and wider at the base and arranged in rows;
   a plurality of blade members having root and airfoil portions, said root portions being received in said grooves and shaped to abut said angled walls for retention in said grooves, there being clearance between said root portions and grooves to allow radial movement therein;
   means for dampening vibration in said blade members including partitions integrally formed with said blade members and projecting laterally of said airfoil portions substantially at right angles thereto and intermediate the ends thereof, opposing partitions of adjacent blade members in a row having end portions in close abutment to contiguously form a shroud ring, wherein the joints of said abutting partitions lie in planes directed at an acute angle to the axis of said grooves;
   a spacer element received in each groove; said spacer element having an upper surface and a lower surface and being located intermediate the bottom wall of said groove and the bottom portion of said blade member root portion, said blade member root portion being supported on said upper surface, said lower surface having a longitudinal channel therein;
   locking means for retention of said spacer elements and said blade members in said grooves; said locking means comprising a key member having a pair of spaced tab end portions joined by a flat intermediate portion, said intermediate portion being received in said channel and said tab end portions being bent transversely thereof to closely overlie said supporting structure adjacent said grooves when in an assembled relationship therewith,
   wherein the radial extent of said spacer element is at least equal to the radial extent of said shroud ring, with respect to said turbomachine axis, in order that any one of said blade members may be moved radially and removed from or inserted into its associated groove individually and without interference between the blade vibration dampening means of said one blade member and the partitions of adjacent blade members, when the spacer element is removed from said associated groove.

3. In an axial-flow turbomachine assembly having a row of generally axial grooves having angled walls and wider at the base an airfoil supported in each groove by a root portion shaped to abut said angled walls for retention in said grooves, there being clearance between the root portion and grooves to allow radial movement therein, each airfoil including stiffening means projecting laterally thereof and abutting like means of adjacent airfoils to form a shroud ring about said airfoils, wherein the lines of abutment of said stiffening means are skewed with respect to the axis of said grooves, means retaining said airfoils in said grooves comprising:
   a spacer having radially-spaced upper and lower surfaces with respect to said turbomachine axis, said spacer being supported on its lower surface and supporting an airfoil on its upper surface;
   a locking member having an intermediate portion spanning said axial groove radially inwardly of said spacer lower surface and spaced end portions extending normally with respect to said intermediate portion, said end portions projecting beyond the width of the groove to preclude axial separation of said locking member and said groove,
   wherein the spacing of said upper and lower surfaces is at least equal to the radial thickness of said stiffening means, whereby in the absence of its associated spacer and locking member any one of the airfoils of said row will be so located in its groove as to be capable of radial movement and separate dis-assembly from said turbomachine without interference between the stiffening means of said one airfoil and the contiguous stiffening means of the adjacent airfoils of said row.

4. In an axial-flow turbomachine assembly having at least one row of generally axial grooves and airfoils supported therein, said grooves having angled walls and wider at the base and said airfoils having root portions shaped to abut said angled walls for retention in said grooves, there being clearance between said root portions and grooves to allow radial movement therein, said airfoils having laterally-extending stiffening means intermediate the ends thereof contiguous in parallel planes, said planes being at an acute angle to the turbomachine axis, means retaining said airfoils in said grooves comprising:

- spacer means received in each groove and located intermediate the bottom wall thereof and the airfoils received therein, each of said spacer means having radially-spaced upper and lower surfaces, with respect to said turbomachine axis, and a channel in said lower surface;
- locking means received in each groove and having tab end portions separated by an intermediate portion, said intermediate portion being received in said channel with said end portions extending transversely thereof beyond the width of said groove, wherein the spacing of said upper and lower surfaces is at least equal to the thickness of said contiguous stiffening means in order that, in the absence of its associated spacer and locking means, any one of the airfoils of said row will be so located in its groove as to be capable of radial movement and separate dis-assembly from said turbomachine without interference between the stiffening means of said one airfoil and the contiguous stiffening means of the adjacent airfoils of said row.

References Cited by the Examiner
UNITED STATES PATENTS

| | | | |
|---|---|---|---|
| 2,421,890 | 6/47 | Johansson | 253—77 |
| 2,955,799 | 10/60 | Oickle | 253—77 |

FOREIGN PATENTS

| | | |
|---|---|---|
| 1,095,392 | 12/54 | France. |
| 834,408 | 3/52 | Germany. |

KARL J. ALBRECHT, *Primary Examiner.*

HENRY F. RADUAZO, *Examiner.*